Dec. 9, 1930. M. A. STEELMAN 1,784,763
GLASS WORKING APPARATUS
Original Filed June 16, 1916   2 Sheets-Sheet 1
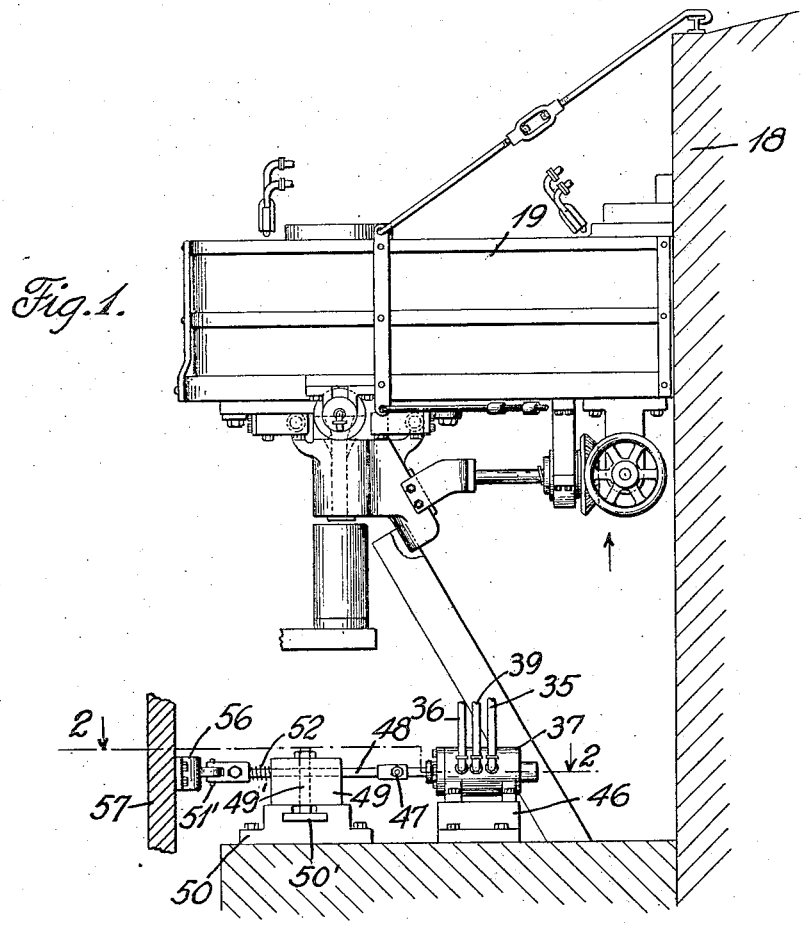
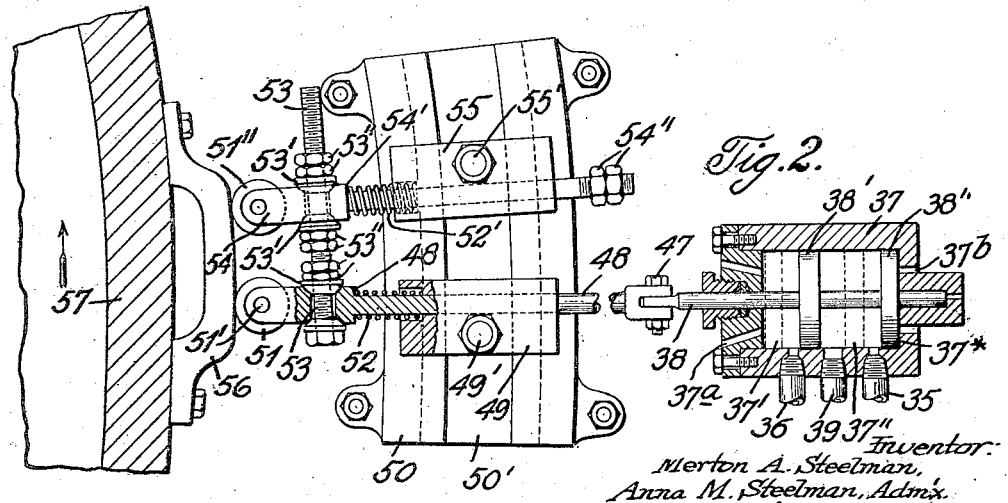

Dec. 9, 1930.  M. A. STEELMAN  1,784,763
GLASS WORKING APPARATUS
Original Filed June 16, 1916    2 Sheets-Sheet 2
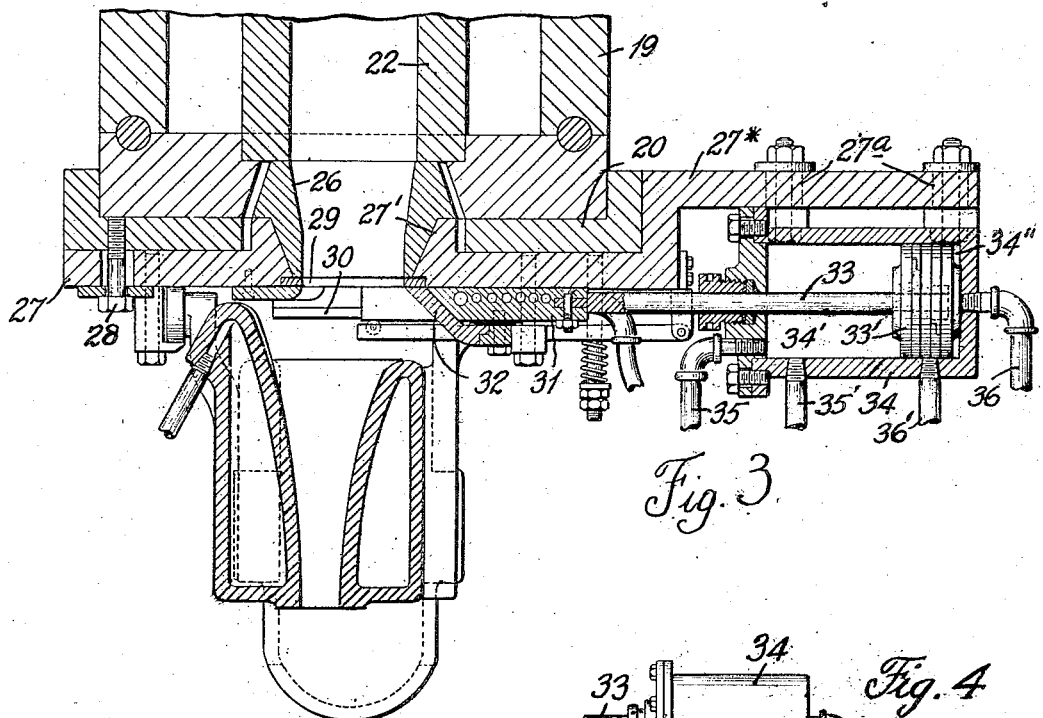
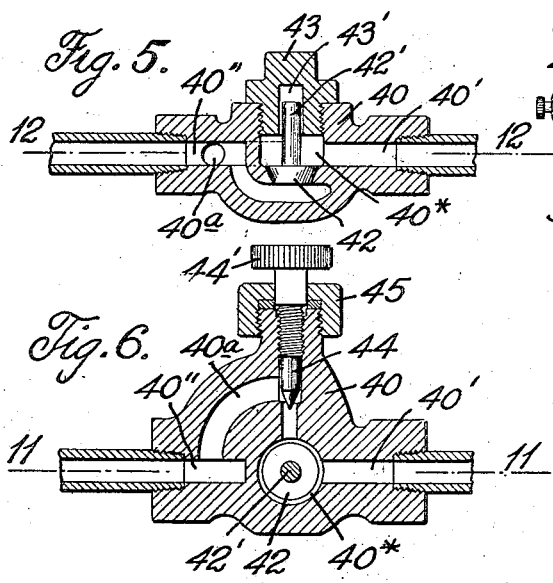
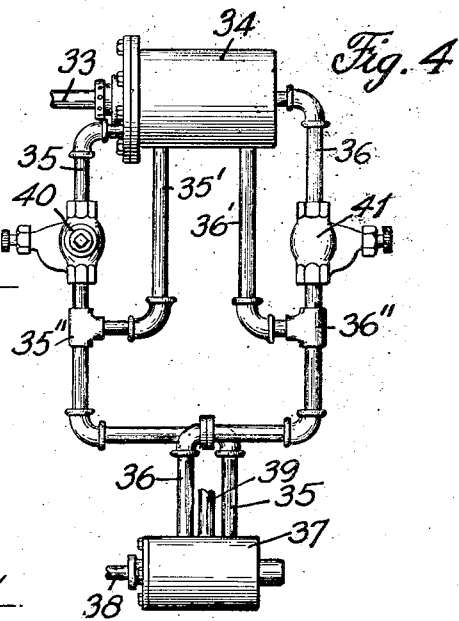
Inventor:
Merton A. Steelman
Anna M. Steelman, Admx.
BY Robert S. Brown
ATTORNEY Patented Dec. 9, 1930

1,784,763

UNITED STATES PATENT OFFICE

MERTON A. STEELMAN, DECEASED, LATE OF VINELAND, NEW JERSEY, BY ANNA M. STEELMAN, ADMINISTRATRIX, OF VINELAND, NEW JERSEY, ASSIGNOR TO HARTFORD-EMPIRE COMPANY, OF HARTFORD, CONNECTICUT, A CORPORATION OF DELAWARE

GLASSWORKING APPARATUS

Original application filed June 16, 1916, Serial No. 101,878. Renewed October 29, 1924. Patent No. 1,603,994, dated October 19, 1926. Divided and this application filed December 19, 1925. Serial No. 76,534.

An application was filed in the United States Patent Office, on June 6th, 1916, Serial Number 101,878 on which Patent No. 1,603,994 was granted Oct. 19, 1926, of which application this is a division, filed for the purpose of claiming certain features of the mechanism disclosed in the original application, particularly the actuation of a glass feeder in response to movement of a glassware shaping machine, and the mechanism by which the timing of such actuation may be varied.

In the accompanying drawings, which are reproductions of part of the drawings of the original application, Figure 1 is a side elevational view of the complete apparatus, as shown in the above-mentioned original application;

Fig. 2 is a horizontal section taken on the line 2—2 of Fig. 1 and shown on an enlarged scale;

Fig. 3 is a vertical sectional view, showing the knife carrier in a position in which it uncovers the nozzle opening;

Fig. 4 shows, in conjunction with Figs. 1, 2 and 3, the mechanism for controlling the operation of the knife carrier, and thereby the glass flow; and Figs. 5 and 6 are sections through one of the valves shown in Fig. 4, Fig. 5 being taken on the line 11—11 of Fig. 6, and Fig. 6 on line 12—12 of Fig. 5.

The six figures of the drawing are Figures 1, 2, 7, 10, 11 and 12 of the original application identified above.

Referring now to the drawings, a glass furnace 18, of any approved construction, has in its wall an outlet from which molten glass is conducted, through a supply channel enclosed in a chamber 19, to an upright discharge chamber 22. The flow of glass from the furnace is controlled by a suitable gate, and burners are provided for heating the glass on its way to the outlet of the discharge chamber. These structural features, with various other details which are appurtenant to the supply channel and its enclosing chamber, but which are not essential to the invention claimed in the present application, are described in detail in my original application identified above.

The chamber 22 communicates at its lower end with a discharge nozzle 26 which is made of fireclay or other refractory material and is supported by an annular flange 27' on a plate 27 which itself is secured to the bottom plate 20 by screws 28.

Set in a recess in the under side of the plate 27, and flush with said under side, is a small plate 29 having an opening of the same size and shape as, and registering with, the lower portion of the nozzle opening. This plate 29, which in effect becomes part of the nozzle, is held in place by two metal strips 30 secured to the plate 27 by screws and forming guides for a movable knife carrier 31, which normally closes the outlet from the nozzle by lying close to the plate 29 against said outlet, and therefore also serves as a valve. The carrier 31, with its knife or blade 32, is adapted to be reciprocated along guide strips 30 to and from the nozzle outlet by the following device: At the end farthest away from the nozzle 26, the carrier is rigidly connected with one end of a piston rod 33 having at its other end a piston 33' adapted to be reciprocated in a cylinder 34 which is carried by a lateral extension 27* of the plate 27 and is adjustable lengthwise in slots 27ª of said extension. The piston is actuated by admitting a fluid under pressure, such as steam or compressed air, to one or the other of its sides, through pipes 35, 36 communicating with the cylinder chambers 34', 34" respectively through ports in the cylinder heads. The admission of the actuating fluid is controlled by a piston valve (Figs. 2 and 4) consisting of a cylinder 37 and a piston rod 38 having two pistons 38', 38" rigidly mounted thereon at a distance from each other and dividing the interior of the cylinder into three chambers 37', 37" and 37*. The cylinder wall has three ports, the central port communicating with a pipe 39 through which the compressed fluid is admitted to the cylinder chamber 37", while the two side ports connect the interior of the cylinder with the pipes 35, 36 respectively. As these pipes 35, 36 serve at times as exhaust pipes (as will be described presently), the heads of the valve cylinder 37 are provided with a number of holes 37ª, 37ᵇ leading to the outside and allowing the exhaust to escape into the surrounding air. The side wall of the cylinder 34 has two ports, one of which is located at a certain distance from one of the cylinder heads, while the other is located at the same distance from the other cylinder head. These ports communicate with pipes 35', 36' respectively connected with the pipes 35, 36 at 35'', 36''. At a point between 35'', 36'' and the heads of the cylinder 34, the pipes 35, 36 are provided with by-pass check valves 40, 41 respectively, the detail construction of which is shown in Figs. 5 and 6 and is as follows: Into the valve casing 40 lead passages 40', 40'', the former communicating with that portion of the pipe 35 which leads to the cylinder 34, while the passage 40'' communicates with the portion of pipe 35 leading to the cylinder 37. Passage 40' leads directly into a central chamber 40*, while between passage 40'' and this chamber is interposed a check valve 42 adapted to be lifted from its seat, the valve stem 42' being guided in a socket 43' provided in the screw cap 43. From the passage 40'', another passage, 40ª, leads to the chamber 40*, this passage being throttled by a needle valve 44 screwing into the valve casing and provided at its outer end with a milled head 44', a screw cap 45 insuring a tight joint. The purpose of these by-pass check valves is to prevent the piston 33' from striking too hard against the cylinder heads. When the compressed fluid is admitted, say to the cylinder chamber 34'' through the pipe 36, the check valve in the valve casing 41 (corresponding to check valve 42 in the valve casing 40) having been lifted by the pressure, so that the fluid can pass unobstructed through the pipe 36, the piston 33' will be moved from the position shown in Fig. 3 toward the other end of the cylinder, expelling the exhaust in chamber 34' through the pipe 35' into the pipe 35 and cylinder chamber 37', from where it will escape to the atmosphere through ports 37ª. As soon as the piston 33' has covered the port leading to the pipe 35', the fluid remaining in the cylinder chamber 34' will be compressed, being allowed to escape but slowly through the passage 40ª in the valve casing 40, and an air cushion will thus be formed which will prevent the piston from striking hard against the cylinder head. When the piston is propelled in the other direction, the operation takes place in a similar manner.

As shown in Fig. 1, the piston valve cylinder 37 is rigidly secured to a stationary support 46. The piston rod 38 is connected by means of a screw 47 to one end of a rod 48 adapted to slide in a stationary bracket 49 secured to a base plate 50 by a screw 49'. At its other end the rod 48 is forked to receive a roller 51 (Fig. 2) mounted to turn in said forked end on a pin 51'. A coiled spring 52, one end of which engages the bracket 49, while the other end bears against a shoulder 48' on the rod 48, tends to push the forked end of the rod carrying the roller 51 away from the bracket 49 and thus the piston rod 38 will normally be in its outermost position, with the piston 38' against the front head of the cylinder. Through a socket provided in the rod 48, at a point between its forked end and the shoulder 48', extends loosely a screw-threaded connecting member 53. Normally, this connecting member is held rigidly to the rod 48 by means of a washer 53' having a spherically-curved engaging surface, in conjunction with the similarly curved head of the connecting member and nuts 53''. The ends of the socket engaged by the washer 53' and by the head of the connecting member are of course curved so as to fit the said spherically-curved engaging surfaces. The connecting member 53 also extends loosely through a socket in a rod 54, but is normally held rigidly to said rod by means of washers 53' and nuts 53''. The rod 54, similarly to the rod 48, carries at one end a roller 51'', has a shoulder 54' engaged by a spring 52' and is adapted to slide in a bracket 55 secured to the base plate 50 by a screw 55'. Its other end is, however, not connected to a piston rod, but is preferably screw-threaded to receive nuts 54'' which will limit its movement in one direction by engaging the bracket 55.

The rollers 51, 51'' will be engaged at times by cams on the machine in conjunction with which my discharge device is used. Thus the cam 56 may be on the rotary member 57 of a bottle-making machine of the well-known type in which a member carrying molds and various other mechanisms rotates about an upright axis. In Fig. 1, the left-hand margin line of the drawing may be assumed to indicate this upright axis.

It will now be clear from the above description that a sliding movement of the rod 48 toward the cylinder 37 will cause, by means of the pipe connections and cylinder arrangements, the knife carrier or valve 31 to be withdrawn from engagement with the nozzle 26, thus allowing the molten material contained in the nozzle and container to be discharged through the nozzle. On the other hand, a movement of the rod 48 away from the cylinder 37 will cause the carrier 31 to again close the nozzle outlet.

The purpose of having two rollers, 51 and 51'', mounted at an adjustable distance from each other, is to be able to regulate the time during which the nozzle is open and thereby vary the amount of molten material to be discharged every time the carrier is withdrawn from the nozzle, without changing the length of the cams engaging the rollers. When it is desired to alter the amount of molten material discharged each time, the nuts 53″ will be loosened and the rollers adjusted to the proper distance from each other. The nuts 53″ are then again tightened, so that the rods 48, 54 will be rigidly connected by the connecting member 53. Any action on the roller 51″ will of course also actuate the rod 48. The bracket 55 in which the rod 54 slides, is of course mounted on the base plate 50 adjustably, and for this purpose the head of the screw 55′ is held in a groove 50′ in the base plate 50, in which it can slide lengthwise with the bracket 55, after the nut on the upper end of the screw 55′ has been loosened. As soon as this nut is again tightened, the screw 55′ and bracket 55 will be rigidly connected with the base plate 50. The rods 48, 54 being almost parallel and their sliding movement only small, the slight play provided in practice will be sufficient to enable them to slide readily in the brackets 49, 55, without any danger of binding.

While the apparatus has been shown and described in connection with a machine for making bottles or similar articles, it may be used wherever it is desired to discharge from a furnace molten material into molds or other receptacles for further treatment.

Various modifications may be made without departing from the nature of the invention as defined by the appended claims.

What is claimed as new, is:

1. Glass working apparatus comprising a feeder for molten glass provided with a discharge outlet and with a fluid-pressure operated shear arranged to reciprocate beneath said outlet, a forming machine provided with molds arranged to receive mold charges from said feeder, a valve for actuating said shear, spaced members for operating said valve, means associated with said forming machine for successively engaging said spaced members, and means for changing the relative spacing of said members and for thereby changing the interval between the reciprocating movement of said shear.

2. Glass working apparatus comprising a feeder for molten glass provided with a discharge outlet and with a fluid-pressure operated shear arranged to reciprocate beneath said outlet to uncover said outlet and permit the glass to issue, and to close said outlet and sever the glass, a forming machine provided with a continuously rotatable mold table, molds carried by said mold table and presented successively in position to receive mold charges of molten glass delivered by said feeder and severed by said shears, a cylinder and piston connected to reciprocate said shear, a valve for admitting fluid under pressure to said cylinder, a member for actuating said valve to move said piston and said shear in one direction, another member, spaced from said first valve-actuating member, for actuating said valve to move said piston and said shear in the opposite direction, means carried by said mold table for engaging, moving and releasing said valve-actuating members, and means for changing the relative spacing of said valve-actuating members, and for thereby changing the interval between the reciprocating movements of said shear.

3. In a device for discharging molten material, a nozzle, means for conveying molten material thereto, a cutter arranged to move transversely under the nozzle outlet, an operating device for said cutter, comprising a controlling member having two elements adjustable to different distances from each other, and an actuating element ranging and moving lengthwise of the direction of adjustment of said first-named elements, and adapted for engagement with them.

4. In a device for discharging molten material, a nozzle, means for conveying molten material thereto, a cutter arranged to move adjacent to the nozzle outlet, a device for moving said cutter, a controlling member the movement of which controls the operation of said cutter-moving device, said controlling member having two elements adjustable to different distances from each other, and an actuating element ranging and moving lengthwise of the direction of adjustment of said first-named elements, and adapted for engagement with them.

5. In a device for discharging molten material, a nozzle, means for conveying molten material thereto, a cutter arranged to move adjacent to the nozzle outlet, a device for moving said cutter, a controlling member the movement of which controls the operation of said cutter-moving device, said controlling member comprising two rods extending alongside each other and provided with rollers at their like ends, a transverse member connecting said rods, means for holding said rods at different distances from each other, and an actuating element ranging and moving lengthwise of the direction of said transverse member, and adapted for engagement by the rollers on said rods.

Signed at Vineland, N. J., this sixteenth day of December, 1925.

ANNA M. STEELMAN,
*Administratrix of Merton A. Steelman, Deceased.*